United States Patent Office 2,880,564
Patented Apr. 7, 1959

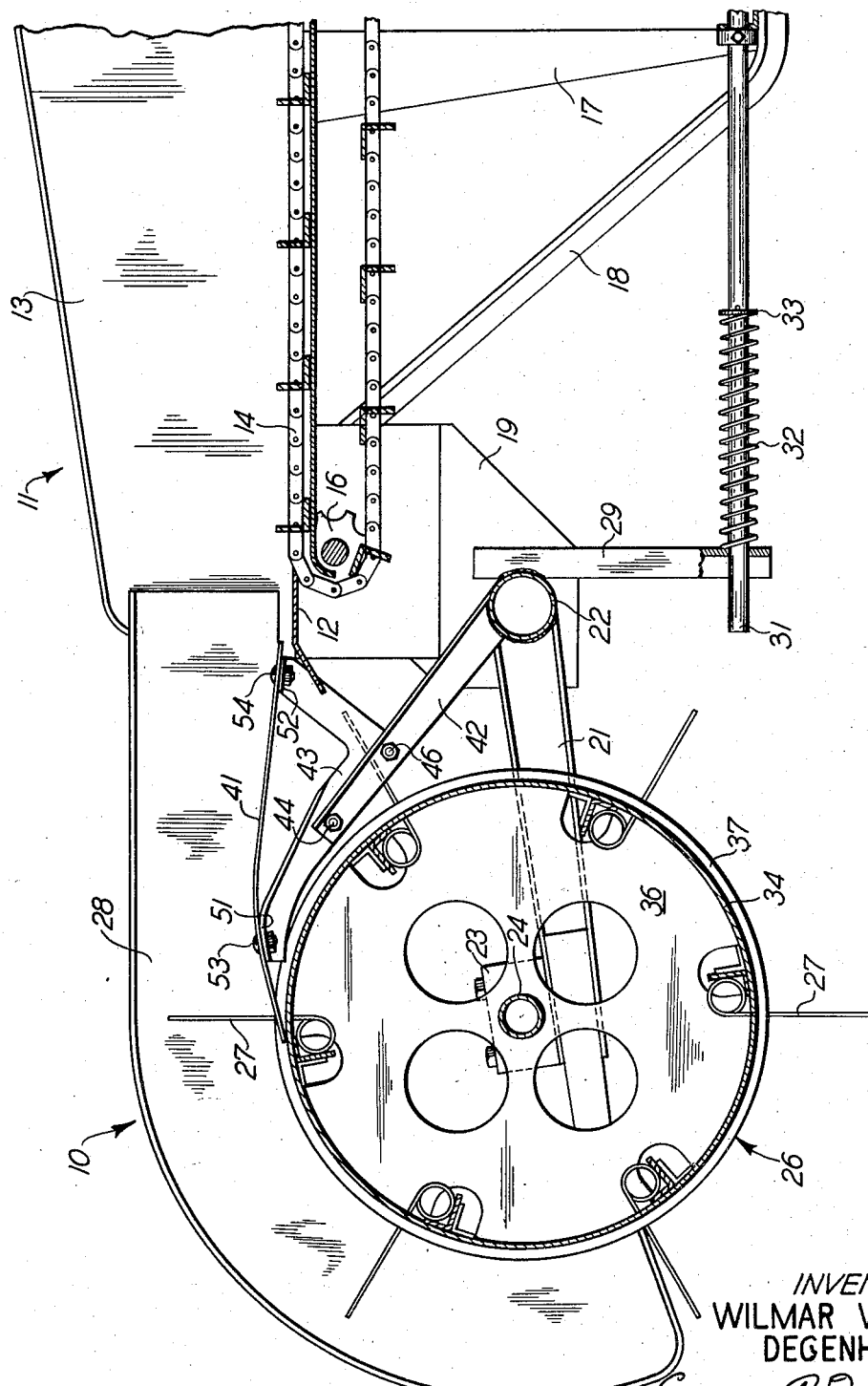

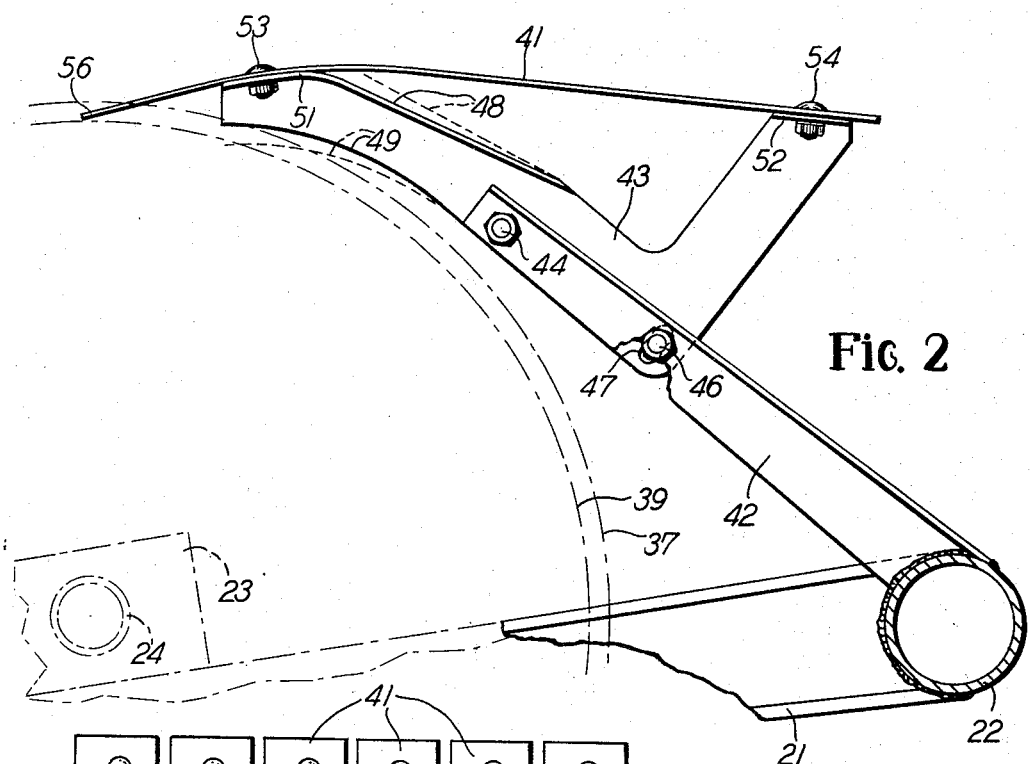
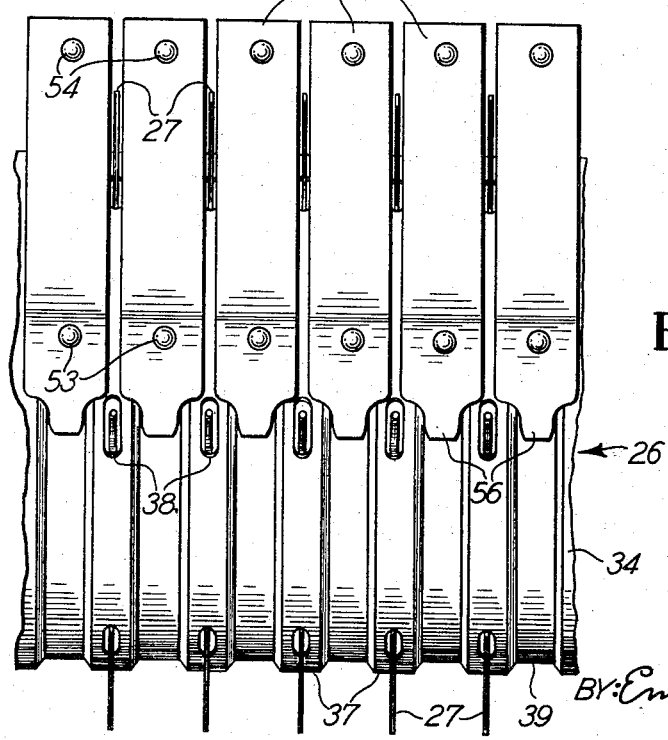

2,880,564

ADJUSTABLE CROP PICKUP DRUM STRIPPER

Wilmar W. Degenhardt, St. Louis, Mo., assignor to J. I. Case Company, Racine, Wis., a corporation of Wisconsin Application March 29, 1956, Serial No. 574,889

4 Claims. (Cl. 56—364)

This invention relates to agricultural crop pickup units, and, more particularly, it relates to the strippers for crop pickup drums used on forage harvesters such as balers.

A common arrangement of a crop pickup unit is the construction of a rotatable drum, which includes a plurality of projecting fingers, and a plurality of strippers mounted adjacent the drum to terminate in a minute clearance from the drum circumference. The well-known operation of this unit is the rotation of the drum to cause the fingers to pick up cut crops from the ground while the strippers intercept the crops from the drum to guide the crops off the drum and onto a conveyor or the like. The strippers are fixed in position with respect to the drum and there is, therefore, a problem in constructing the pickup unit to properly position the strippers with the minute clearance required and also to maintain the clearance when the parts are subjected to the normal rugged treatment of farm equipment. Of course, if the strippers are not properly spaced from the drum, they will not perform properly for the well-known reasons of either failing to remove crops from the drum, if spaced too far from the drum, or by being rubbed by the drum if the strippers are in contact with the drum.

It is an object of this invention to provide a crop pickup unit with a stripper which is adjustable for easy and ready positioning with respect to the drum to achieve the desired setting between the stripper and the circumference of the drum.

Another object of this invention is to provide a crop pickup unit with a plurality of strippers which can be individually adjustably positioned with respect to the drum circumference and which can also be individually replaced as desired.

Still another object of this invention is to provide a crop pickup unit with stripper mountings and stripper fingers which inherently position the stripper fingers or plates as desired. More explicitly, in the present instance, the stripper mountings include two mounting surfaces which are disposed in two slightly angularly related planes while the stripper fingers are made of a spring steel which flexes slightly to conform to the planes at opposite ends of the fingers. The planes and the fingers are constructed to present the latter tangentially to the drum at one end of the fingers and at a different desired angle at the other end of the fingers. No pre-forming of the fingers is thus required and the employment of spring steel results in a durable stripper finger construction.

Other objects and advantages will become apparent upon reading the following description in conjunction with the accompanying drawings, wherein:

Fig. 1 is a fragmentary and partially sectioned side elevational view of a pickup unit including a preferred embodiment of this invention.

Fig. 2 is an enlarged view of a fragment of Fig. 1 but with parts broken away and with parts shown in different positions by dotted lines.

Fig. 3 is a top plan view of a fragment of Fig. 1.

Similar reference numerals refer to similar parts throughout the several views.

The general construction of a crop pickup unit is described in U.S. Patent No. 2,713,762. As shown in the instant drawings, a pickup unit 10 is suitably attached forwardly of a delivery or receiving unit 11 of the type generally employed in forage harvesters, balers, and the like. In operation, cut crops are picked up from the ground by the pickup unit 10, as the harvester or baler advances over the ground, and the crops are deposited onto the delivery unit 11 for transmission to the harvester or baler, other sections which are not shown as they form no part of this invention.

The receiving unit 11 can be of any well-known or suitable construction and it is shown to include a receiving platform 12 flanked by upwardly extending sides such as the shown side 13. A suitable conveyor 14 is trained about a sprocket 16 to ride along the platform 12 and carry the crops deposited onto the platform to the rear of the machine. Also, suitable supporting members 17, 18, and 19 are included to support the pickup and the delivery units in the usual manner.

The pickup unit 10 is suitably supported forwardly of the unit 11 through two arms, such as the arm 21, with one arm on each side of the machine and supported at its rear end on a mounting member or pipe 22 extending transversely of the units. The forward ends of the arms 21 carry bearing blocks 23 which in turn support a shaft 24. The latter has a drum 26 mounted on it for rotation in a clockwise direction as viewed in Fig. 1, and the drum is suitably driven for rotation. Also, the usual crop pickup fingers 27 are attached to the interior of the drum 26 to project radially therefrom as shown. A side sheet, such as the sheet 28, is attached to be disposed on each side of the drum 26 for guiding the crops along the pickup unit 10 to the delivery unit 11 in the usual manner. It is customary in this machine to have the pipe 22 rotatably mounted in the support members 19 while the arms 21 are rigid with the pipe 22 as is an arm 29. The lower end of the arm 29 has a rod 31 slidably secured therein while the rear end of the rod 31 is anchored to the frame pieces 17 and 18. A compression spring 32 is disposed on the rod 31 between the arm 29 and a stop 33 fixed on the rod 31. With this arrangement, the pickup unit 10 is spring mounted on the machine and it is, therefore, less likely to be damaged in operation.

The drum 26 includes a circumferential sheet 34 supported by two end sheets, such as the sheet 36, and the end sheets 36 and the sheet 34 are suitably connected together. The sheet 34 is formed with a plurality of equally spaced and circumferential beads or raised portions 37 disposed in planes transverse to the drum shaft 24. Equally spaced openings 38 are provided in the beads 37 for the projection of the fingers 27 through the sheet 34. The surface of the sheet 34 is thus corrugated to alternately present raised portions 37 and depressed portions 39 along a line parallel to the drum axis. Crops picked up by the drum are generally supported across the raised portions 37 as the crop forms a bridge over the depressed portions to be spaced therefrom.

In the usual operation, the machine is moved along the ground to the left as the drum is rotated clockwise, as viewed in Fig. 1. The fingers 27 pick up the cut crop from the ground and move it up to the top of the drums through the rotation of the latter. At this point, a plurality of stripper fingers or plates 41 intercept the crops from the drum 26 and direct the crops to the platform 12. The important feature of this invention is the type and mounting of the stripper plates 41. In this regard, it will be seen that a plurality of plates are provided and likewise a similar plurality of stripper supporting elements or arms 42 are provided. The latter are rigidly mounted on the member 22 to rotate therewith when the drum is raised or lowered under the influence of its own weight and the spring 32. The arms 42 each support an L-shaped stripper supporting bracket 43 through a bolt 44 which pivotally attaches each bracket to its respective arm adjacent the upper end thereof. A second bolt 46 also attaches the bracket to the arm, and it will be seen from Fig. 2 that the bracket contains a slot 47 for receiving the bolt 46 while the latter is tightly received in the arm 42. Thus, there is a slotted connection between the arms 42 and the bracket 43 for pivot of the brackets on the arms about the bolts 44. The limits of pivot of the brackets are shown by the dotted lines 48 and 49 which represent the limits of the pivoted positions of the surfaces 48 and 49 on the brackets.

It will be noted that the ends of the bracket 43 include portions 51 and 52 which are disposed in certain planes. The portion 51 is forwardly and downwardly inclined in the position shown and has one end of the plate 41 secured thereto by a bolt 53 while the opposite end of the plate is secured to the portion 52, which is rearwardly and downwardly inclined in the position shown, by a bolt 54. The plates 41 are preferably made of spring steel and they therefore bend to conform to the positions of the portions 51 and 52, taking a somewhat upwardly bowed configuration. The front ends of the plates 41 are thus substantially tangential to the drum 26 while the rear ends of the plates are substantially coplanar with the platform 12.

Fig. 3 shows that the plates 41 are spaced in line with the depressions on the drum, and that the drum fingers 27 have sufficient clearance between the plates 41 to pass between them. Also, the front ends 56 of the plates 41 are reduced in width to be received in the drum depressions and therefore terminate at the base of the depressions to insure good interception of the crops on the drum. Of course, the bracket portion 51 is swingable toward and away from the drum 26, and the plates 41 are correspondingly separately adjustable in their positions with respect to the drum.

While a specific embodiment of this invention has been shown and described, it should be obvious that certain deviations therefrom could be effected, and the invention should, therefore, be limited only by the scope of the appended claims.

I claim:

1. In a pickup unit for an agricultural implement, a rotatable drum supported in position to directly contact material to be picked up, said drum having spaced circumferential crop supporting substantially continuous raised portions, means adjacent the drum including a plurality of stripper supporting elements corresponding to the number of, and spaced in accordance with the spacing of the areas between said raised portions, a plurality of stripper supporting brackets adjustably carried on said stripper supporting elements including a pivot bolt connecting each of said brackets with its respective supporting element and each bracket having a portion swingable toward and away from said drum by reason of swinging of said bracket about said pivot bolt, means for securing said bracket in adjusted position including a bolt spaced from said pivot bolt, engaged between said bracket and said element and including a slotted connection, stripper plates mounted on said bracket and projecting toward the drum in a direction generally opposite to the movement of the surface of the drum resulting from normal operation thereof and terminating between said raised portions closer to the surface of said drum than the tops of said raised portions, and a plurality of pickup fingers projecting from each of the raised portions of the drum and positioned substantially in the medial radial plane of their respective raised portions so as pass between the stripper plates, said stripper plates being greater in width than the width of the individual raised portions of said drum, and said raised portions supporting the crop in a sufficiently elevated position with respect to the circumferential surface of said drum to clear the forward ends of said stripper plates.

2. In a pickup unit for an agricultural implement, a rotatable drum supported in position to directly contact material to be picked up, said drum having spaced circumferential crop supporting substantially continuous raised portions, means adjacent the drum including a stripper supporting element, a plurality of stripper supporting brackets adjustably carried on said stripper supporting element including a pivot bolt connecting each of said brackets with its respective supporting element and each bracket having a portion swingable toward and away from said drum by reason of swinging of said bracket about said pivot bolt, means for securing said bracket in adjusted position including a bolt spaced from said pivot bolt, engaged between said bracket and said element and including a slotted connection, stripper plates mounted on said bracket and projecting toward the drum in a direction generally opposite to the movement of the surface of the drum resulting from normal operation thereof and terminating between said raised portions closer to the surface of said drum than the tops of said raised portions, and a plurality of pickup fingers projecting from each of the raised portions of the drum and positioned substantially in the medial radial plane of their respective raised portions so as to pass between the stripper plates, said stripper plates being greater in width than the width of the individual raised portions of said drum, and said raised portions supporting the crop in a sufficiently elevated position with respect to the circumferential surface of said drum to clear the forward ends of said stripper plates.

3. A stripper construction and mounting on a cut crop pickup unit of the type including a rotatable pickup drum and a receiving platform spaced from said drum, the combination of a stripper supporting element rigidly attached to said pickup unit, a stripper supporting bracket adjustably mounted on said element for adjustment toward and away from the circumference of said drum, said bracket including a forwardly and downwardly inclined portion disposed at least approximately tangential to the circumference of said drum at the top thereof and approaching the drum from the side toward which the drum is rotating, and a rearwardly and downwardly inclined portion disposed adjacent said receiving platform, a flexible stripper attached to said portions of said bracket and forced by said bracket to assume the same stated tangential relation with said drum, for bridging the space between said drum and said platform, and flexing to also assume the rearwardly inclined position of the rearwardly and downwardly inclined portion.

4. A stripper construction for use on a cut crop pickup unit of the type including a rotatable drum and a receiving platform spaced from said drum, the combination of a stripper supporting element rigidly attached to said pickup unit, a stripper supporting bracket pivotally mounted on said element for pivotal movement toward and away from the circumference of said drum, means on said element for securing said bracket in a selected pivoted position on said element, and a stripper plate attached to said bracket and disposed in the space between said drum and said platform, extending to the circumference of said drum for intercepting crop disposed on said drum and for guiding said crop to said platform.

References Cited in the file of this patent

UNITED STATES PATENTS

| | | |
|---|---|---|
| 2,490,143 | Magee | Dec. 6, 1949 |
| 2,657,520 | Lock et al. | Nov. 3, 1953 |
| 2,713,762 | Clausen | July 26, 1955 |